US007156002B1

(12) United States Patent
Chan

(10) Patent No.: US 7,156,002 B1
(45) Date of Patent: Jan. 2, 2007

(54) TOOL SHAFT AND TOOL BIT ARRANGEMENT

(76) Inventor: Fu-Yi Chan, No. 24, Alley 9, Lane 82, Yitung Rd., Taping City, Taichung County (TW)

( * ) Notice: Subject to any disclaimer, the term of this patent is extended or adjusted under 35 U.S.C. 154(b) by 0 days.

(21) Appl. No.: 11/211,661

(22) Filed: Aug. 26, 2005

(51) Int. Cl.

| | |
|---|---|
| ***B25B 23/16*** | (2006.01) |
| ***B25B 23/00*** | (2006.01) |
| ***B23G 1/08*** | (2006.01) |
| ***B23G 1/01*** | (2006.01) |
| ***B23G 1/00*** | (2006.01) |

(52) U.S. Cl. ......................... 81/177.4; 81/438; 81/439; 81/177.5; 81/177.85; 81/489; 81/490; 81/491; 81/492

(58) Field of Classification Search ............... 81/177.4, 81/438, 439, 177.5, 177.85, 489–492
See application file for complete search history.

(56) References Cited

U.S. PATENT DOCUMENTS 939,079 A * 11/1909 Pack ........................... 81/490
5,842,394 A * 12/1998 Hwang ........................ 81/439

* cited by examiner

*Primary Examiner*—Lee D. Wilson
*Assistant Examiner*—Bryan R. Muller
(74) *Attorney, Agent, or Firm*—Rosenberg, Klein & Lee

(57) ABSTRACT

A tool shaft and tool bit arrangement is disclosed to include a hollow shaft, which has a hexagonal through hole through the two ends to accommodate a number of tool bits in a line, a locating block held down by a clamp in a radial through hole near the front end of the shaft to hold down the first tool bit, a steel ball held down by a clamp in a radial through hole near the rear end of the shaft to hold down the last tool bit, and a grip fixedly fastened to the periphery of the rear end of the shaft.

4 Claims, 4 Drawing Sheets

TOOL SHAFT AND TOOL BIT ARRANGEMENT

BACKGROUND OF THE INVENTION

1. Field of the Invention

The present invention relates to hand tools and more particularly, to a tool shaft and tool bit arrangement.

2. Description of the Related Art

FIGS. 1A and 1B show a tool shaft and tool bit arrangement for use in a detachable screwdriver. According to this design, the shaft 10 has a hexagonal rear coupling rod 11 for coupling to a handle (not shown), a hexagonal front coupling hole 12, a locating groove 13 extending around the periphery near the front end, two tapered through holes 14 formed in the locating groove 13 in communication with the hexagonal front coupling hole 12 at two sides, two steel balls 15 respectively mounted in the tapered through holes 14, and a clamp 16 fastened to the locating groove 13 to hold down the steel balls 15. When the tool bit 1 is inserted into the hexagonal front coupling hole 12, the clamp 16 imparts a pressure to the steel balls 15 against the periphery of the tool bit 1, thereby securing the tool bit 1 firmly to the tool shaft 10. This arrangement is still not satisfactory in function. Because the tool shaft 10 is a solid shaft, it has no room for storing tool bits. Further, when the clamp 16 starts to wear after a long use, the tool bit 1 may slip from the steel balls 15.

SUMMARY OF THE INVENTION

The present invention has been accomplished under the circumstances in view. According to one aspect of the present invention, the top shaft and tool bit arrangement comprises a hollow tool shaft, which has a hexagonal center through hole extending through the two distal ends for accommodating a plurality of tool bits in a line. According to another aspect of the present invention, each tool bit has a locating groove extending around the periphery. Further, a locating block is held down by a clamp in a radial through hole near the front end of the shaft to hold down the first tool bit, and a steel ball held down by a clamp in a radial through hole near the rear end of the shaft to hold down the last tool bit. According to still another aspect of the present invention, a grip fixedly fastened to the periphery of the rear end of the shaft so that the assembly can be directly used as a hand tool.

DETAILED DESCRIPTION OF THE PREFERRED EMBODIMENT

Figure 1A:
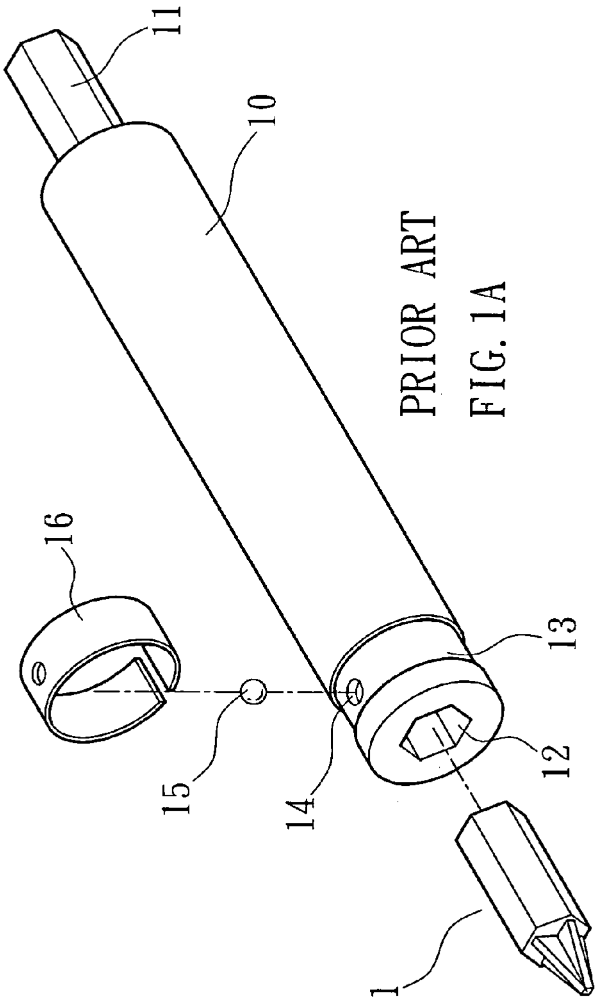
PRIOR ART FIG. 1A
FIG. 1A is an exploded view of the prior art design.
Figure 1B:
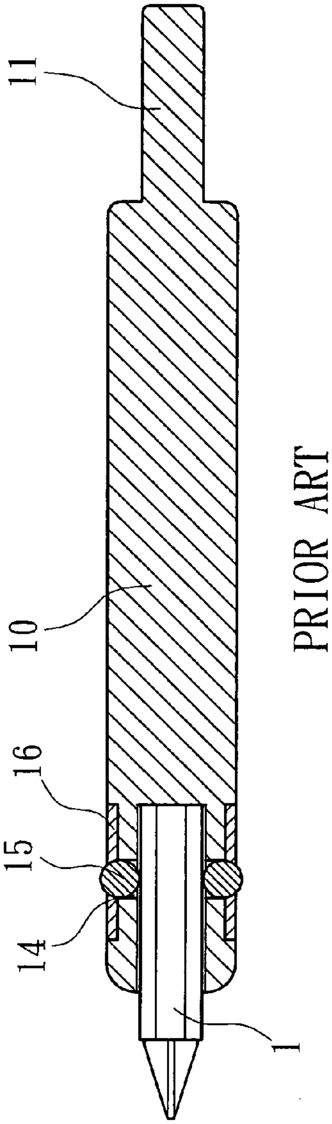
PRIOR ART FIG. 1B
FIG. 1B is a sectional assembly view of the prior art design.
Figure 2:
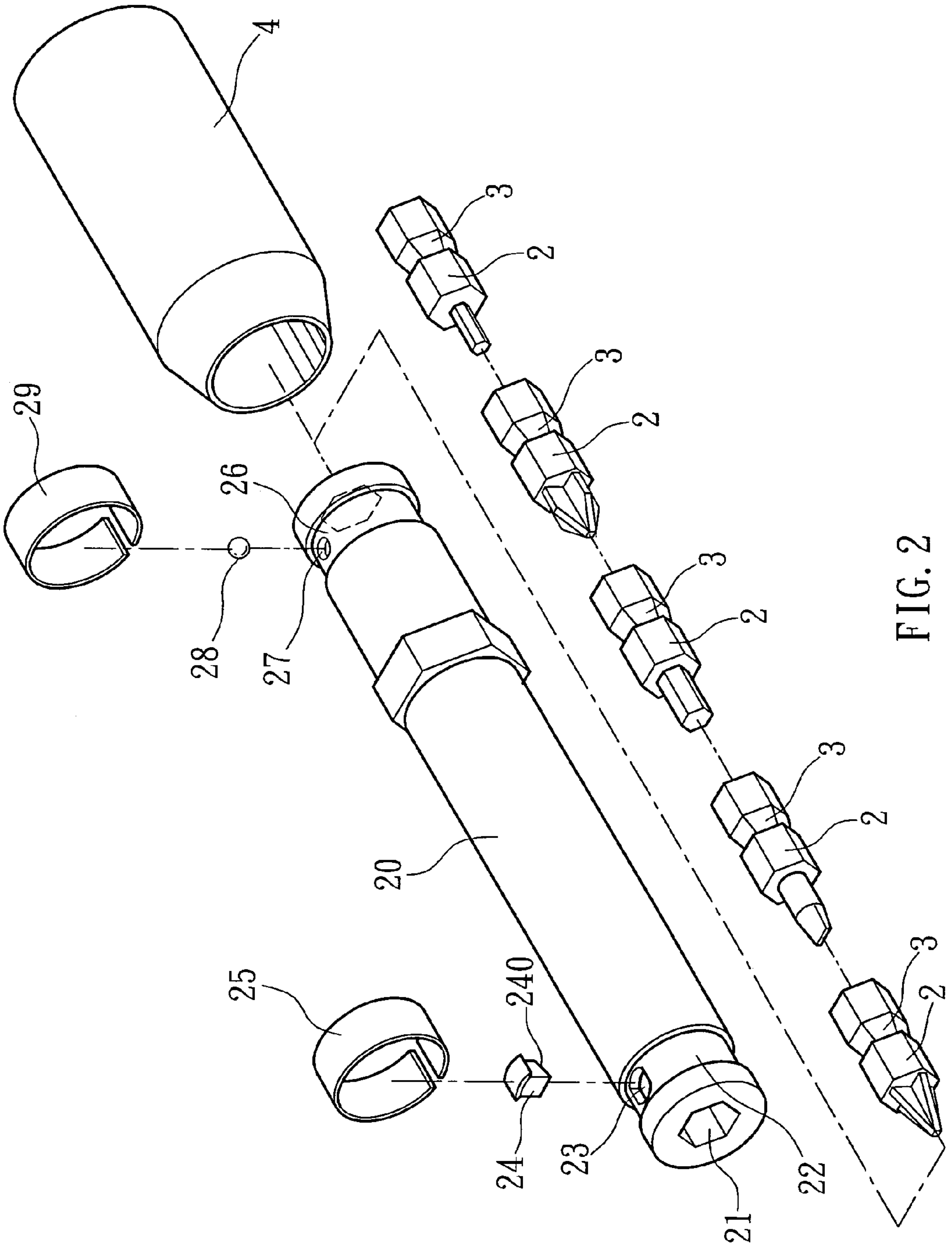
FIG. 2 is an exploded view of a tool bit and tool shaft arrangement according to the present invention.
Figure 3:
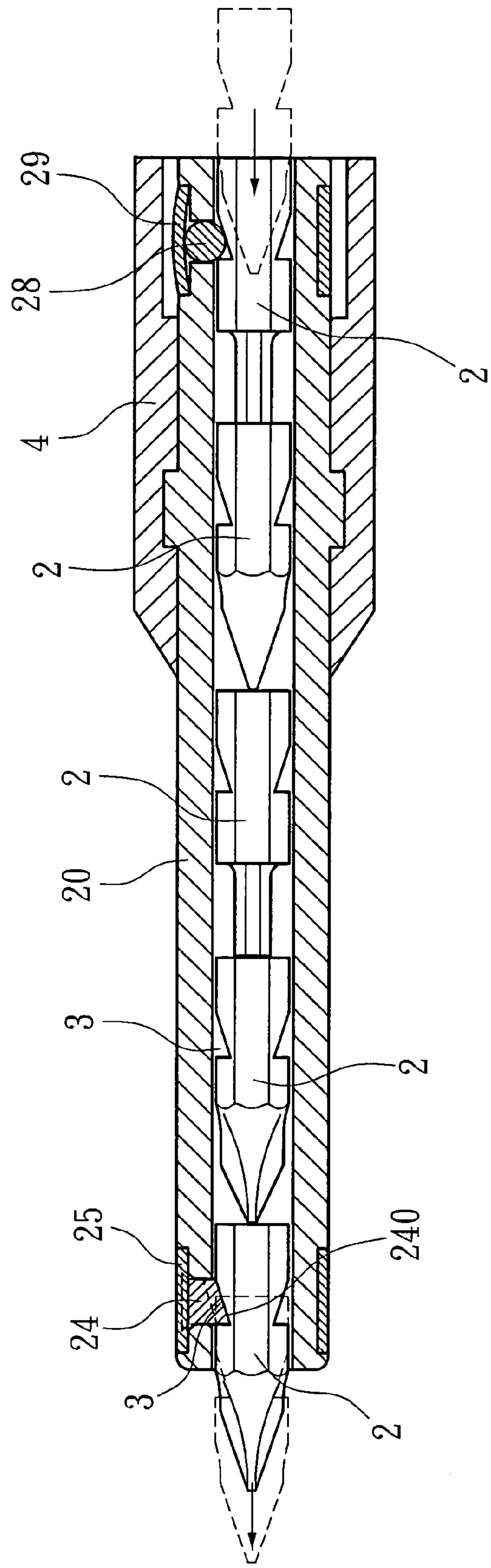
FIG. 3 is a sectional assembly view of FIG. 2.

Referring to FIGS. 2 and 3, a tool shaft and tool bit arrangement in accordance with the present invention is shown comprised of a shaft 20, a set of tool bits 2, and a grip 4.

The shaft 20 is a hollow cylindrical bar having a hexagonal center through hole 21 axially extending through the front and rear ends thereof, a first locating groove 22 extending around the periphery near the front end, a second locating groove 26 extending around the periphery near the rear end, a first radial through hole 23 formed in the first locating groove 22 in communication with the hexagonal center through hole 21, a second radial through hole (tapered through hole) 27 formed in the second locating groove 26 in communication with the hexagonal cente3r through hole 21. A locating block 24 is movably mounted in the first radial through hole 23, having a beveled bottom edge 240. A steel ball 28 is movably mounted in the second radial through hole 27. The first clamp 25 is fastened to the first locating groove 25 to hold down the locating block 24 in the first radial through hole 23. A second clamp 29 is fastened to the second locating groove 26 to hold down the steel ball 28 in the second radial through hole 27.

The tool bits 2 are insertable into the hexagonal center through hole 21 of the shaft 20, each having a locating groove 3 extending around the periphery.

When the tool bits 2 are respectively inserted into the hexagonal center through hole 21 of the shaft 20, the beveled bottom edge 240 of the locating block 24 is forced by the first clamp 25 into engagement with the locating groove 3 of the first tool bit 2 to hold down the first tool bit 2 in position, keeping the tip of the first tool bit 2 outside the front end of the shaft 20 for working. At the same time, the steel ball 28 is forced by the second clamp 29 against the periphery of the last tool bit 2, preventing falling of the tool bits 2 out of the rear side of the shaft 20. Further, the locating groove 3 of each tool bit 2 has a vertical front sidewall and a beveled rear sidewall. The first clamp 25 forces the beveled bottom edge 240 of the locating block 24 into the locating groove 3 of the tool bit 2, therefore the tool bit 2 is prohibited from backward displacement and will not move forwards relative to the shaft 20 without an external push force.

Further, the grip 4 is a hollow shell fixedly fastened to the periphery of the rear end of the shaft 20.

Figure 4:
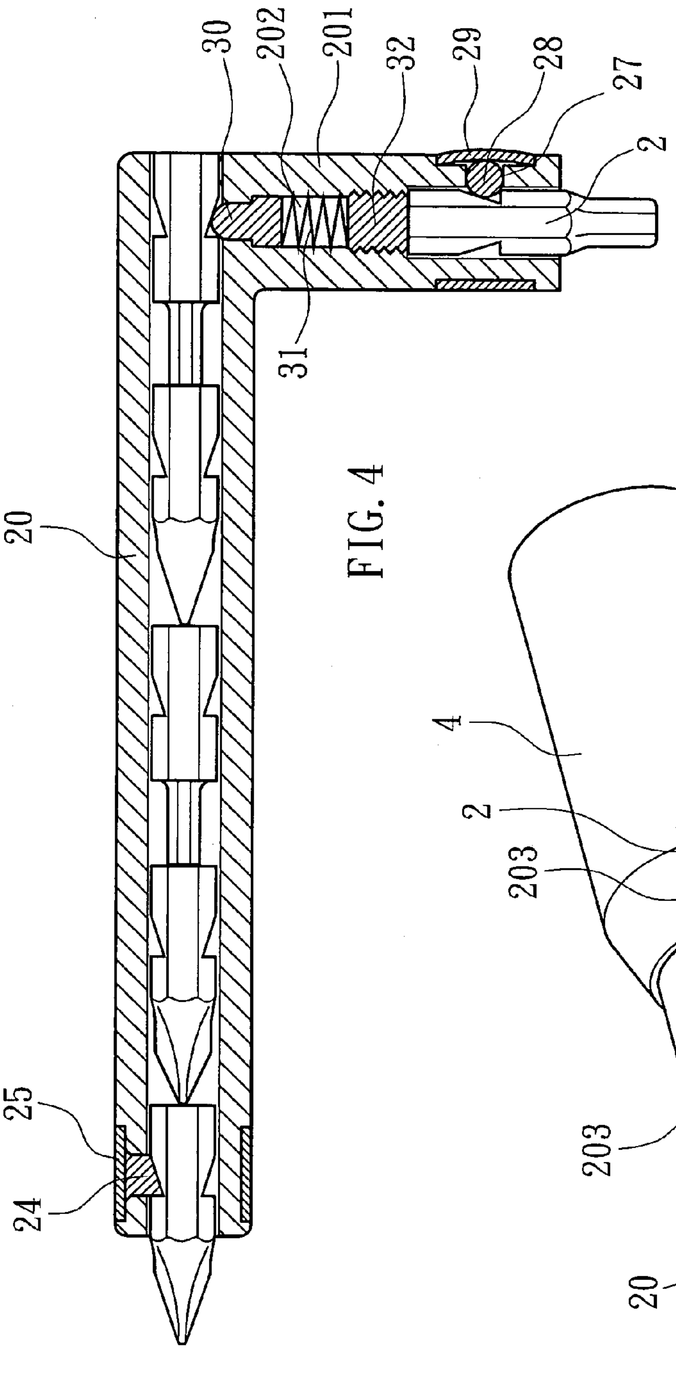
FIG. 4 is a sectional assembly view of an alternate form of the present invention.

FIG. 4 shows an alternate form of the present invention. According to this embodiment, the shaft 20 has a rear extension 201 extending from the rear end at right angles. The rear extension 201 has an axial center through hole 202 and a tapered through hole 27 extending in radial direction in communication with the axial center through hole 202. A stop block 32 is fixedly mounted in the axial center through hole 202 on the middle to support a compression spring 31. A locating block 30 is supported on the compression spring 31 and forced into engagement with one tool bit 2 in the shaft 20. A steel ball 28 is movably mounted in the tapered through hole 27, and held down by a clamp 29 to hold down a tool bit 2 in the rear end of the rear extension 201.

Figure 5:
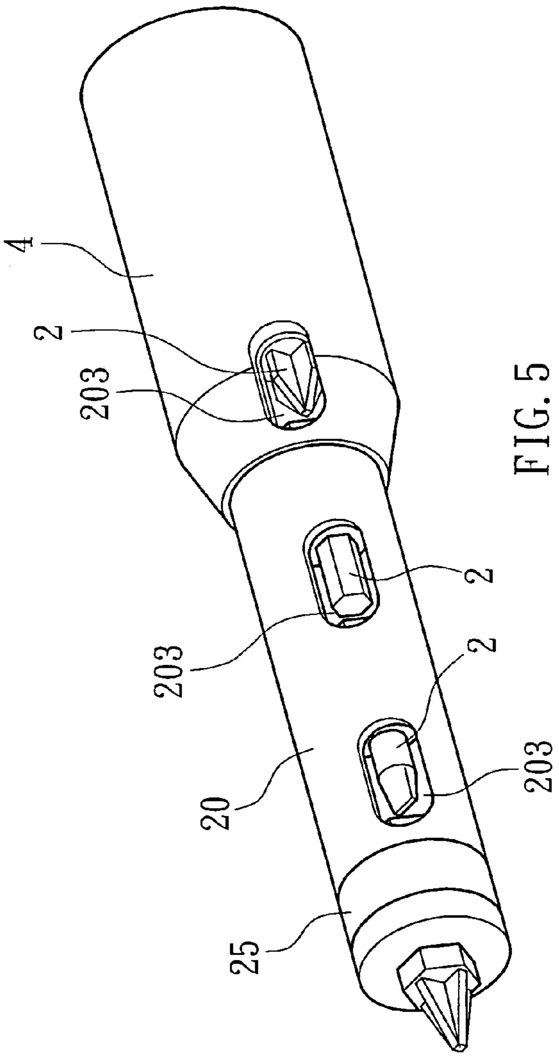
FIG. 5 is a perspective view of another alternate form of the present invention.

FIG. 5 shows another alternate form of the present invention. According to this embodiment, side openings 203 are formed in the shaft 20 and the grip 4. Through the openings 203, the user can see the types of the respective tool bits 2 that are stored in the shaft 20.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A tool shaft and tool bit arrangement comprising:

a shaft, said shaft having a first axis a hexagonal center through hole axially extending through front and rear ends thereof, a first locating and a second locating groove respectively extending around the periphery near the front and rear ends, a first radial through hole formed in said first locating groove in communication with said hexagonal center through hole, a second radial through hole formed in said second locating groove in communication with said hexagonal center through hole;

a plurality of tool bits each having a locating groove located thereon, respectively movably inserted into the hexagonal center through hole of said shaft and arranged in a line;

a locating block movably mounted in said first radial through hole of aid shaft for holding down one of said tool bits in the front end of said shaft, said locating block having a beveled bottom edge for engaging into the locating groove of one of said tool bits;

a steel ball movably mounted in said second radial through hole of said shaft for holding down one of said tool bits in the rear end of said shaft;

a first clamp fastened to said first locating groove to hold down said locating block in said first radial through hole; and a second clamp fastened to said second locating groove to hold down said steel ball in said second radial through hole.

2. The tool shaft and tool bit arrangement as claimed in claim 1, wherein said shaft defining an L-shaped configuration having a rear extension comprising a second axis that is substantially normal to said first axis, said rear extension comprising an axial through hole, said second radial through hole extending in radial direction of the rear extension in communication with the axial center through hole of said rear extension, a stop block fixedly mounted in the axial center through hole of said rear extension on the middle, a compression spring supported on said stop block, a locating block supported on said compression spring and forced into engagement with one tool bit in the rear end of said shaft, said steel ball movably mounted in the said second radial through hole of said rear extension, wherein said second clamp, which holds down the steel ball in the tapered through hole of said rear extension to secure one tool bit in said rear extension.

3. The tool shaft and tool bit arrangement as claimed in claim 1, further comprising a grip fixedly fastened to the periphery of the rear end of said shaft.

4. The tool shaft and tool bit arrangement as claimed in claim 1, wherein said shaft has a plurality of side openings through which the user can see the types of the tool bits stored in said shaft.

* * * * *